May 12, 1959 — O. HIGHLAND ET AL — 2,886,060
FLUID PRESSURE LINE LOCKING MECHANISM
Filed Oct. 22, 1954
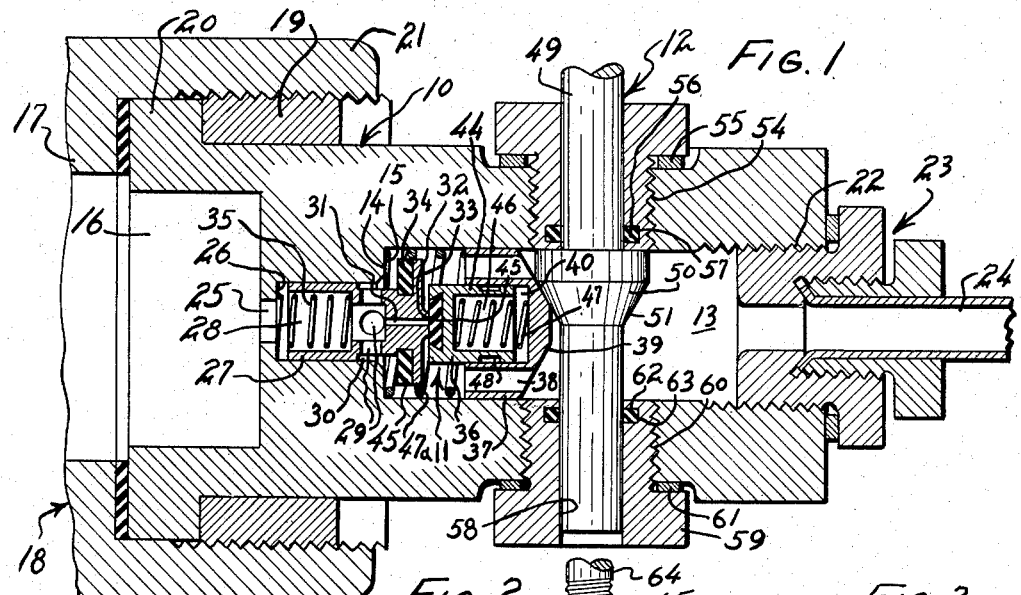
FIG. 1
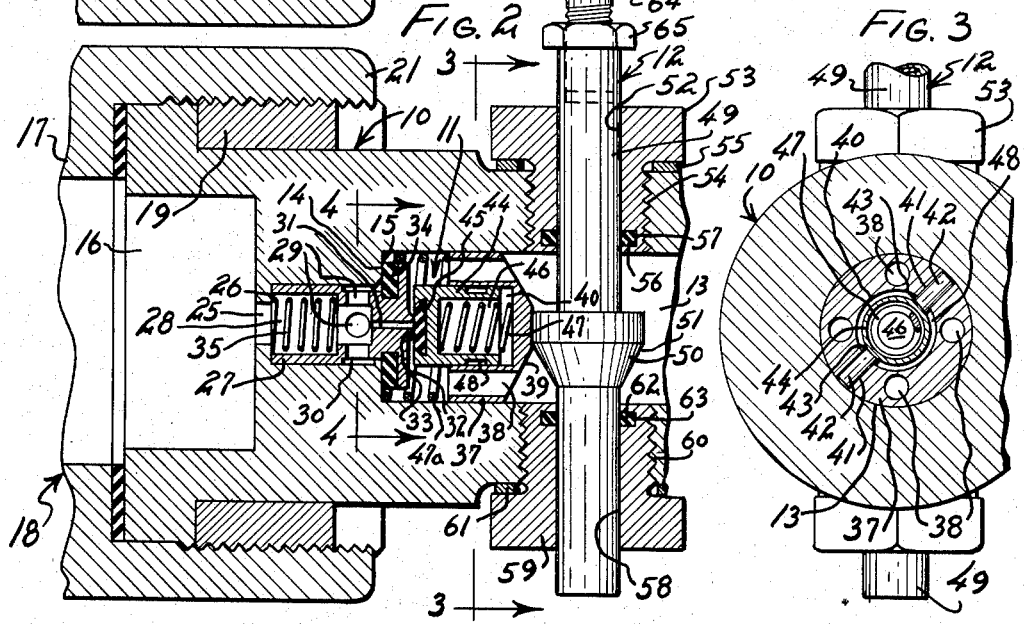
FIG. 2
FIG. 3
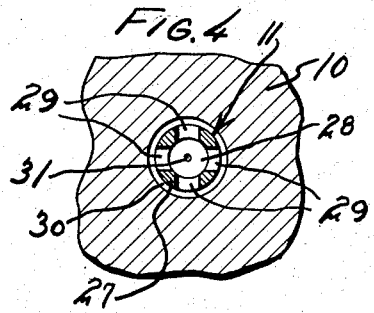
FIG. 4
INVENTORS
OLAF HIGHLAND
LEON A. CHELMO
BY Williamson, Williamson,
Schroeder & Adams
ATTORNEYS

United States Patent Office 2,886,060
Patented May 12, 1959

2,886,060

FLUID PRESSURE LINE LOCKING MECHANISM

Olaf Highland, Long Lake, and Leon A. Chelmo, Minneapolis, Minn.

Application October 22, 1954, Serial No. 464,038

5 Claims. (Cl. 137—512.1)

This invention relates to a fluid pressure line locking mechanism, and more particularly to a valve lock for hydraulic brake systems and the like.

It is customary in hydraulic brake systems for vehicles and the like to use the hydraulic pressure lines for ordinary braking purposes and to have auxiliary mechanical brakes which serve as emergency measures or for setting devices for maintaining the brakes in locked position. It has previously been considered impractical to use the hydraulic pressure line for locking or setting brakes because of the uncertainty of the movement and positioning of the mechanical parts necessary for attaining a given braking action. Whereas the movement and behavior of mechanical linkages, such as gears, pivot arms and the like, can be completely ascertained because the fixed pivot points and other dimensions are predetermined, there is no corresponding predetermined movement in the case of hydraulic brake mechanisms and, as a matter of fact, each braking action is more apt to be different from, than identical with, the previous action for the reason that excess braking fluid is constantly recirculated to the reservoir of a master cylinder and resupplied to the cylinder as needed. The piston in the cylinder may therefore come to rest at one position during a braking operation and may come to rest at another position during another such operation. Stopping or locking the foot brake pedal at a predetermined position will therefore not properly set and hold the brakes for all circumstances, and the hand-operated emergency brake is conventionally relied upon for setting the brakes. Except for such emergency or setting use, it is generally conceded that hydraulic brakes are superior to mechanical brakes for ordinary usage because exactly equal pressure will automatically be supplied to each of the wheel brakes from the master cylinder of a vehicle irrespective of uneven wear on the several brake drums and linings.

Another difficulty in using hydraulic lines for locking or setting brakes lies in instantaneously and reliably entrapping a proper amount of fluid under a predetermined pressure. Since the braking fluid is an incompressible fluid, the slightest leak or lag in cutting off from returned braking fluid, will of course rapidly diminish or completely lose the braking force.

It is an important object of the present invention to provide a line locking mechanism for hydraulic fluid lines which will quickly and surely entrap and hold fluid under pressure so that it may be employed for setting brakes or other function requiring continuous and constant fluid pressure.

Another object of the invention is to provide a safe, simple and efficient device for increasing the utility of the conventional master cylinder braking system by rendering the braking system capable of locking and holding hydraulic pressure therewithin.

It is a further object of the invention to provide a locking device for fluid pressure lines which has means to supplement additional fluid in small quantities for increasing or maintaining fluid pressure after the locking device is set, and to permit release of the fluid lock when the device is rendered inoperative.

Another object of the invention is to provide an easily operated attachment for the master cylinders of vehicles having hydraulic brakes for increasing the utility of the fluid braking system so as to include holding as well as temporary application of braking force.

A still further object is to provide a device of the class described which is mountable directly across a fluid pressure line and in which the locking mechanism is externally controlled so as to be operable for locking and for increasing fluid pressure while in locked position, yet capable of being rendered inoperative so that the fluid line will permit normal unrestricted flow of fluid under pressure.

These and other objects and advantages of the invention will more fully appear from the following description made in connection with the accompanying drawings, wherein like reference characters refer to the same or similar parts throughout the several views, and in which:

Fig. 1 is a vertical section of my device mounted across a fluid pressure line, portions thereof being shown in full line and unessential parts being cut away; the cam pin is shown in the inoperative position;

Fig. 2 is a vertical section similar to that of Fig. 1 showing the cam pin moved to locking position;

Fig. 3 is a vertical section taken on the line 3—3 of Fig. 2, portions of the view being cut away; and Fig. 4 is another vertical section taken on the line 4—4 of Fig. 2 in the segmented area indicated.

With continued reference to the drawing, our locking device comprises a casing or body member 10, a dual valve mechanism shown generally at 11, and a locking element illustrated generally at 12. The casing or body portion 10 has a longitudinal bore 13 with a shouldered area 14 formed intermediate the ends thereof, said shouldered area providing a forwardly facing annular seating surface 15. The bore 13 is adapted to interconnect at 16 with the supply line 17 of a fluid pressure system, the fluid supply line in the present instance being the forward end of a master cylinder shown generally at 18. A threaded collar 19 is utilized to make a fluid-tight connection between the rearward end of the body or casing 10 and the forward end of the master cylinder 18. An abutment collar 20 is slidably mounted within the outlet end of cylinder 18, and the threaded collar 19 serves to bear upon the collar to effect the fluid-tight connection when advanced inwardly in the corresponding threaded end 21. The forward end of the body or casing 10 is also internally threaded at 22 so as to interfit with a connecting fitting 23 to establish a fluid-tight connection with the forward fluid pressure line 24. It is preferred that the inlet 16 of the bore be somewhat enlarged so as to provide additional fluid space in conjunction with the master cylinder outlet 17. The bore 13 then constricts at 25 and has a smaller abutment or shoulder 26 as shown in Fig. 1.

A dual valve mechanism shown generally at 11 comprises a flow control valve 27 which has a large medial bore 28 extending part way through the valve and communicating with laterally formed passageways 29 such as shown in Figs. 1, 2 and 4. The valve has an annular recess 30 which interconnects with the passageways 29 to permit flow of fluid through medial bore 28 and passageway 29. The flow control valve further has a restricted passageway 31 which interconnects with the bore 28 and terminates forwardly in an orifice 32. The flow control valve 27 further has an enlarged forward end 33 which forms a backing for resilient washer or sealing ring 34. A compression spring 35 is interposed between the shoulder 26 and the forward end of bore 28 so as to normally maintain the sealing ring 34 out of engagement with the shouldered area 15.

A locking valve 36 is also mounted for longitudinal sliding movement within bore 13 and is adapted to lie forwardly of the flow control valve, as shown in Fig. 1. The locking valve has an enlarged forward head 37 which in turn has longitudinal passageways 38 extending therethrough to permit unrestricted flow of fluid from behind the outer area to a position forwardly of the dual valve mechanism. The forward end of the enlarged portion 37 has a conical surface 39 for a purpose to be presently described. The enlarged portion 37 has a medial bore 40. The enlarged portion 37 also has laterally extending openings 41 which are interposed between the longitudinal bores 38 as shown in detail in Fig. 3. The openings 41 are adapted to receive pins 42 having inwardly extending ends 43 as shown.

Mounted within the bore 40, and also forming a part of the locking valve 36, is a sealing plunger 44 which in turn has a resilient valve plug 45 constructed of rubber or the like for engaging the orifice 32 of restricted passageway 31. The plunger has a hollow bore 46 adapted to retain a compression spring 47 which normally urges the plunger away from the forward enlarged portion 37 and toward the orifice 32 of restricted opening 31 as shown in Fig. 1. A relatively stronger spring 47a is interposed between the shouldered area 15 and the rearward circumferential margin of enlarged head 37 so as to urge the entire locking valve forwardly with respect to bore 13. The sealing plunger 44 also has an annular groove 48 which is adapted to receive the pins 42 and to permit limited sliding movement of the sealing plunger with respect to the forward enlarged end of the locking valve.

Referring now to Figs. 1 and 2, a locking element shown generally at 12 is reciprocably mounted transversely of the body or casing 10 and passes through the bore 13 to provide an abutment which affects the longitudinal position of the dual valve mechanism. The locking element 12 in turn comprises a shaft 49 having an enlarged camming collar 50 formed medially of the ends thereof, the frusto-conical surface 51 of the cam 50 preferably having the same slope as the surface 39 at the forward end 37 of the locking valve. The shaft 49 is slidably received within a bore 52 of nut 53, the nut 53 being threadably secured through a wall of the casing 10 at 54. A sealing washer 55 prevents the escape of fluid through the threaded connection and a sealing ring 56, such as an O-ring, is positioned in an annular groove 57 formed within the bore 52 so as to prevent escape of fluid past the ring as it lies in wiping contact with the shaft 49. The lower end of the shaft 49 is similarly slidably received within a bore 58 of nut 59 which is threadably secured at 60 through an opposite wall of casing 10. A corresponding sealing washer 61 is employed to seal the nut 59 with respect to the casing 10 and a sealing ring such as O-ring 62 is provided within an annular groove 63 within bore 58 so as to lie in wiping and sealing contact with the free end of shaft 49.

The locking element 12 may be operated directly by manual means or may be provided with a connecting rod 64 which is threadably secured to one end of the locking element shaft 49 and may be locked in position with lock nut 65, as shown in Fig. 2. The connecting rod 64 may in turn terminate in some form of handle or other actuating member (not shown) which can be conveniently positioned such as at the dashboard of a vehicle.

In the use and operation of our fluid pressure line locking mechanism, the device is interposed in fluid-tight connection across a fluid pressure line with the inlet indicated at 16 and the outlet at 24. When the locking element 12 is in inoperative position as shown in Fig. 1, the flow control valve will assume the position there shown with the passageways 29 in registry with the spaces 30 so as to permit fluid under pressure to enter the rearward portion 25 of bore 13 and pass through bore 28 of the flow control valve, and to pass around the forward sealing member 34 and thence through the longitudinal passageways 38. Fluid then can pass around the shaft 49 and into the forwardly extending fluid line 24 in normal manner. When the fluid pressure is greater in the forward line 24 than in the rearward line 16, the fluid will flow freely in the other direction. Now, however, when it is desired to lock fluid under pressure in the forward line 24, pressure is applied to the fluid at 16 with the locking element 12 having its shaft 49 moved to the position shown in Fig. 2. The cam member 50 will then have progressed with its frusto-conical surface 51 in contact with the forward angulated face 39 of the locking valve so as to force the locking valve rearwardly against the compression of spring 47a. At the same time, spring 47 will be exerting pressure rearwardly against the sealing plunger 44 so as to bring the resilient sealing member 45 against orifice 32 of the flow control valve. Further, the compressive force of spring 47 will normally overcome the compressive force of spring 35 and cause the sealing ring 34 to seat firmly against the shoulder seat 15 as shown in Fig. 2. With the fluid under pressure in line 24, the rearward escape of the fluid is prevented by virtue of the contact of the locking valve with the orifice 32, and with the contact of the sealing ring 34 with its corresponding seat 15. If it is desired to supply additional pressure to the fluid in line 24, the pressure is increased through the passageway 16, thereby causing the seat 34 to move forwardly and permit a restricted flow of pressure fluid through the valve system and into line 24. The sealing plunger 44 will move forwardly with the sealing plug 45 maintaining its sealed relation with the orifice 32. The limited movement is permitted because of the slightly greater width of the annular groove 48 over that of the pins 42 having their inward ends 43 lockably lying within the groove 48. Again the pressure acquired in the line 24 will be maintained as long as the locking element is not disturbed.

Now, however, if the locking pin is moved upwardly to its inoperative position as shown in Fig. 1, the spring 47a will overcome the fluid pressure within line 24 and move the locking valve forwardly, thus permitting the pressurized fluid to flow rearwardly in the reverse manner as set forth above. If, however, the fluid pressure in line 24 is so great as to maintain both the flow control valve and the locking valve in seated relation with the locking element 12 in withdrawn or inoperative position, then it may become necessary to apply a temporary surge of fluid pressure through the opening 16 rearwardly of the dual valve mechanism which will unseat the sealing plug 45 through restricted passageway 31 and permit the pressure to equalize between the locking valve and the flow control valve. Spring 47a will then force the locking valve forwardly and will permit escape of fluid rearwardly through the restricted passageway 31. As the pressure decreases forwardly of the flow control valve, the compression spring 35 will follow so as to unseat the sealing ring 34 and return the dual valve mechanism to its non-locking position shown in Fig. 1. The larger passageways 29 will then be in registry with the annular groove 30 and unrestricted flow of fluid will be permitted in either direction for normal usage such as temporary operation of an automobile fluid brake system with the liquid under pressure being supplied from the master cylinder.

It may thus be seen that we have provided a novel locking mechanism for interposition in a fluid pressure line which will permit normal operation of the line, yet will be operable to lock fluid pressure at one side of the device and will further have provision for increasing the pressure while the lock is operative, as well as having means for breaking the seal to unlock the fluid line when it is desired to return the device to its inoperative condition.

It will, of course, be understood that various changes may be made in the form, details, arrangement and proportions of the various parts without departing from the scope of our invention.

What is claimed is:

1. A device for locking fluid under pressure in a hydraulic line comprising, a body member having forward and rear ends and having a shouldered bore extending axially completely therethrough and adapted to be interposed in fluid-tight connection across a fluid pressure line, a flow control valve slidably mounted in the bore and normally spring pressed out of seating engagement with the shouldered area of the bore, said flow control valve having a restricted passageway formed completely therethrough, a locking valve slidably mounted in said bore forwardly of the flow control valve and normally spring pressed forwardly of the shouldered area and having resilient seating with the flow control valve to shut off said restricted passageway, and means actuable to forcibly position the locking valve and the flow control valve in shut position while permitting the resilient seating of the locking valve to yield and to permit restricted flow of fluid when the pressure in the line rearwardly of the flow control valve exceeds that forwardly of the locking valve.

2. A device for locking fluid under pressure in a hydraulic line comprising, a body member having forward and rear ends and having a bore extending axially completely therethrough for interposition in fluid-tight connection across a fluid pressure line and further having a forwardly facing annular valve seat medially of the ends of said bore, a flow control valve slidably mounted in the bore and normally spring pressed out of seating engagement with said annular valve seat, said flow control valve having a substantially unrestricted passageway rearwardly of the seat-engaging portion and a medial restricted passageway formed longitudinally therethrough and terminating in a forwardly facing orifice, a locking valve slidably mounted in said bore forwardly of the flow control valve and normally spring pressed forwardly of the shouldered area and having resilient seating to shut off said restricted passageway, and means actuable to forcibly position the locking valve and the flow control valve in shut position while permitting the resilient seating of the locking valve to yield and to permit restricted flow of fluid when the pressure in the line rearwardly of the flow control valve exceeds that forwardly of the locking valve.

3. A device for locking fluid under pressure in a hydraulic line comprising, a body member having forward and rear ends and having a shouldered bore extending axially completely therethrough and adapted to be interposed in fluid-tight connection across a fluid pressure line, a flow control valve slidably mounted in the bore and normally spring pressured out of seating engagement with the shouldered area of the bore, said flow control valve having a restricted passageway formed completely therethrough, a locking valve slidably mounted in said bore forwardly of the flow control valve and normally spring pressed forwardly of the shouldered area, said locking valve having a rearwardly facing sealing plunger spring pressed rearwardly with respect to the locking valve to shut off said restricted passageway, and means actuable to forcibly position the locking valve and the flow control valve in shut position while permitting the sealing plunger of the locking valve to yield forwardly and to permit restricted flow of fluid in a forward direction when the pressure in the line rearwardly of the flow control valve exceeds that forwardly of the locking valve.

4. A device for locking fluid under pressure in a hydraulic line comprising, a body member having forward and rear ends and having a shouldered bore extending axially completely therethrough and adapted to be interposed in fluid-tight connection across a fluid pressure line, a flow control valve slidably mounted in the bore and having a restricted passageway formed completely therethrough, resilient means pushing forwardly on said flow control valve to normally unseat the valve with respect to the shouldered area of the bore, a locking valve slidably mounted in said bore forwardly of the flow control valve and spring pressed forwardly of the shouldered area, said locking valve having a sealing plunger slidably mounted therewithin for limited movement rearwardly with respect to the locking valve, resilient means pushing rearwardly on the sealing plunger, and means actuable to forcibly position the locking valve and the flow control valve in shut position while permitting said sealing plunger to yield and to permit restricted flow of fluid when the pressure in the line rearwardly of the flow control valve exceeds that forwardly of the locking valve, said rearwardly pushing resilient means being of greater force than the forwardly pushing resilient means when the locking valve and flow control valve are in shut position.

5. A device for locking fluid under pressure in a hydraulic line comprising, a body member having forward and rear ends and having a shouldered bore extending axially completely therethrough and adapted to be interposed in fluid-tight connection across a fluid pressure line, a flow control valve slidably mounted in the bore and urged resiliently forward normally in clearance with the shouldered area of the bore to permit flow of fluid through in both directions, said flow control valve having a restricted passageway therethrough to provide independent limited communication through the bore, a locking valve having a forward head urged constantly in a forward direction with respect to said bore and further having a sealing plunger urged constantly rearward for a short limited distance with respect to said forward head, said sealing plunger being aligned with said restricted passage and normally in resilient contact therewith to prevent reverse flow of fluid therethrough, and locking means engageable with the forward head of said locking valve and shiftable rearwardly to move said locking valve and said flow control valve rearwardly into seating engagement with the shouldered area and maintaining resilient sealing contact of said restricted passage by said plunger, whereby to positively prevent the rearward flow of fluid through said passageway, but permitting small flow forwardly through the restricted passage whenever the fluid pressure ahead of the flow control valve exceeds that beyond the flow control valve.

References Cited in the file of this patent

UNITED STATES PATENTS

| | | |
|---|---|---|
| 398,719 | Gold | Feb. 26, 1889 |
| 1,876,246 | King | Sept. 6, 1932 |